March 23, 1971  J. G. PARKS  3,572,087

PHASE ANGLE MEASUREMENT OF ULTRASONIC VELOCITIES

Filed Sept. 24, 1969  2 Sheets-Sheet 1

JACK G. PARKS
INVENTOR

BY Harry M. Saragovitz
Edward J. Kelly
Herbert Berl and
Edward P. Barthel

ATTORNEYS

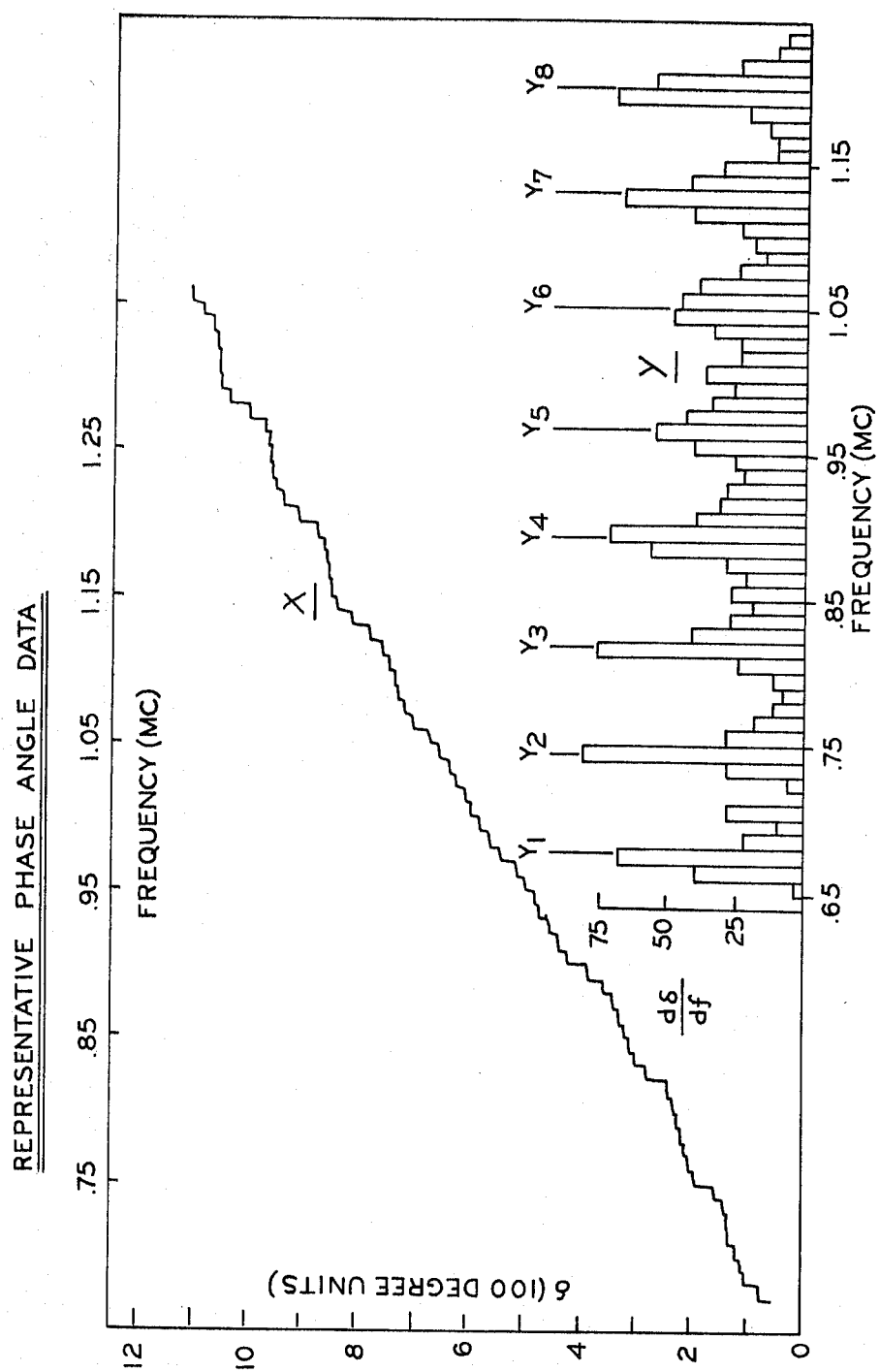

United States Patent Office
3,572,087
Patented Mar. 23, 1971

1

3,572,087
PHASE ANGLE MEASUREMENT OF
ULTRASONIC VELOCITIES
Jack G. Parks, Troy, Mich., assignor to the United States of America as represented by the Secretary of the Army
Filed Sept. 24, 1969, Ser. No. 860,741
Int. Cl. G01n 29/02
U.S. Cl. 73—67.2
7 Claims

ABSTRACT OF THE DISCLOSURE

An electronic device and method for determining the velocity of propagation of compressional sound waves in non-dispersive liquids by measuring relationship between phase angle and frequency. The device uses a double crystal, fixed geometry, ultrasonic interferometer to measure the compressional wave velocities in the liquid.

---

The invention described herein may be manufactured, used, and licensed by or for the Government for governmental purposes without payment to me of any royalty thereon.

BACKGROUND OF THE INVENTION

(1) Field of the invention

This invention relates to an electronic apparatus and method for determining the velocity of propagation of compressional sound waves in liquids.

(2) Description of the prior art

The measurement of the velocity of longitudinal sound waves in liquids is important in that it provides a method of determining the adiabatic compressibility of a liquid. The adiabatic compressibility, together with the isothermal compressibility provide a sufficient basis for the accurate calculation of the ratio of the specific heats of the medium; a quantity which at present is only calculable using complicated and approximate thermodynamic relations. The standard techniques used to measure longitudinal sound velocities in liquids use ultrasonic interferometers or acoustical pulse systems. The ultrasonic interferometer method is the type involved in the instant invention.

The prior art ultrasonic interferometer consists of a source of longitudinal sound waves (normally a piezoelectric crystal) mounted at one end of a fluid column and a flat metallic reflector mounted at the other end. By suitable use of electronic circuits, one may observe the variation of circuit parameters as the standing wave pattern within the chamber is altered. This pattern change can be affected by either moving the reflector along the principal axis of the chamber or by varying the frequency at which the transducer oscillates; in both cases the ratio of path length to wave length in the fluid is changed.

The movable plate, single crystal interferometer was first constructed and analyzed by F. W. Pierce in 1925 in the American Academy of Arts and Science, vol. 60. It was used for the determination of velocity and attenuation of sound waves in gases. The application of this device to liquids was accomplished by D. R. McMillan, Jr. and R. T. Lagemann in 1947 in the Journal of Acoustical Society of America, vol. 21. Increased sensitivity, especially in the presence of fluids with large absorption coefficients, can be obtained by replacing the reflecting plate by a second crystal, identical to the transmitting crystal. Changes are then detected in the circuit associated with the second transducer. The two crystal interferometer was first analyzed by W. J. Fry in 1949 in the Journal of the Acoustical Society of America, vol. 21.

SUMMARY

The variable path interferometer, when applied to liquids, requires adequate seals, accurate linear motion and sensitive displacement measurements; conditions which complicate an already difficult measurement problem. The configuration of an ultrasonic interferometer can be greatly simplified by varying the frequency of the applied signal rather than changing the physical dimensions of the resonant chamber. The chamber crystal can then be accurately positioned in a permanent configuration and displacement measurements replaced by frequency determinations.

The invention covers a fixed geometry, two-crystal ultrasonic interferometer to measure the compressional sound wave velocities in liquids to provide a method of determining the adiabatic compressibility of the liquid. The apparatus consists essentially of an oscillator used to excite a piezoelectric transducer together with means to monitor the transmitted signal received by a second transducer. The frequency of the initial signal is monitored and the phase angle between the initial and received signals is compared using a dual trace oscilloscope or automatically compared using a phase meter possessing an analog output to drive an XY plotter. Alternatively a differential circuit may be connected to the output of a phase meter and used to trigger a counter printer system.

BRIEF DESCRIPTION OF THE DRAWINGS

FIG. 3 is a graph of the phase angle data of the invention.

DESCRIPTION OF THE PREFERRED EMBODIMENT

Figure 1:
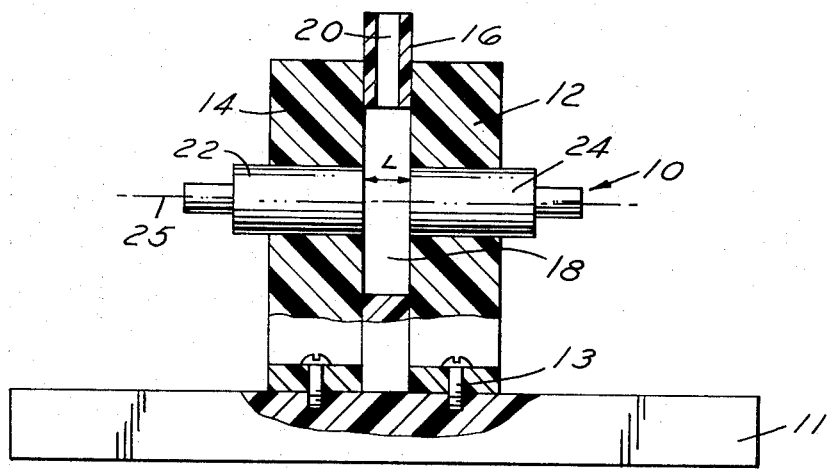
FIG. 1 is a plane view, partly in section, of the inteferometer chamber of the invention.

Referring now to the drawings, FIG. 1 shows the ultrasonic interferometer generally indicated at 10 having a base portion 11 for mounting thereon by suitable means such as bolts 13, a pair of end members 12 and 14 and a circular ring intermediate member 16 located therebetween forming with the end members a central circular chamber 18. The member 16 is provided with a passage 20 for the entry of fluid into the chamber 18 while the end members 12 and 14 support a pair of opposed tubular transducer members 22 and 24 respectively therein such that they are concentric with the principal axis 25 of the circular chamber 18.

The members 12, 14 and 18 in the instant embodiment are formed from acrylic plastic (Plexiglas) bonded by an adhesive, such as supplied under the trade name Du Pont 910, while the transducers are sealed to the members 12 and 14 by a silicone rubber adhesive of the type manufactured by General Electric. Acrylic plastic is used because it is optically transparent to allow the easy detection and elimination of bubbles introduced in the liquid during the filling of the chamber. Also the acrylic plastic has a low coefficient of thermal expansion so that the intratransducer spacing will not be sensitive to room temperature variations. Also the material is chemically inert in the presence of the particular liquid under investigation. It should be noted that other suitable materials, such as quartz, might be substituted for the acrylic plastic.

The particular transducers 22 and 24 of the instant embodiment are frequency matched ultrasonic transducers of the piezoelectric type such as manufactured by Branson Instrument, Inc., their Model No. Z–101–C.

Figure 2:
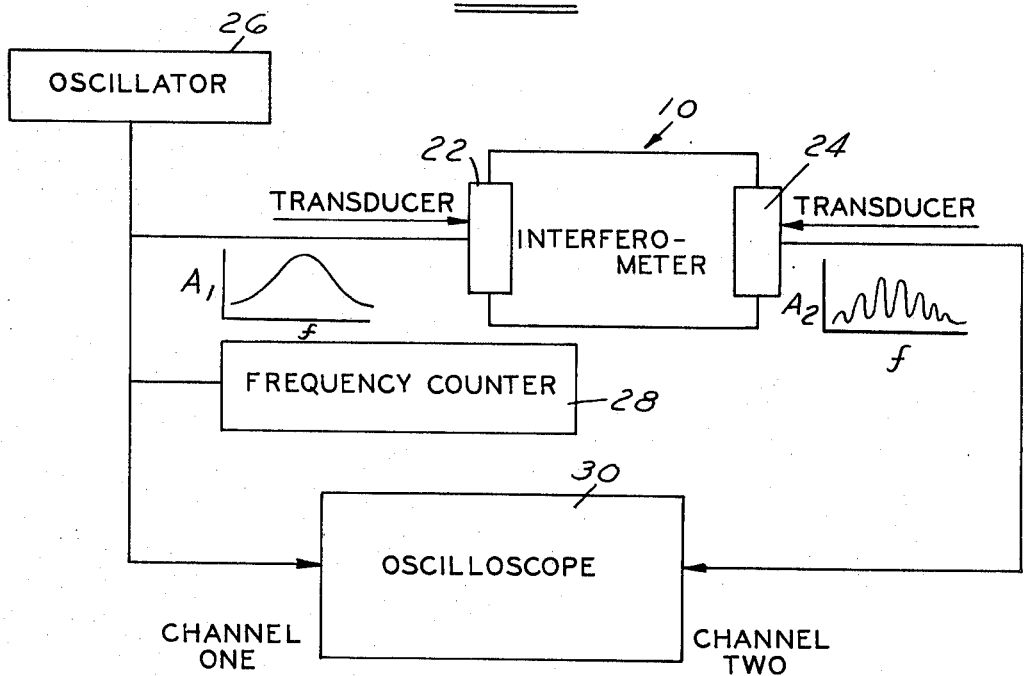
FIG. 2 is a block diagram of the invention.

With reference now to FIG. 2, a schematic representation of the apparatus used to carry out the principles of the present invention is illustrated. The output of an oscillator or signal generator 26, of a type supplied by the General Radio Company their Model No. 1001–A, for example, is used to excite the input transducer 24 together with a frequency counter 28 which monitors the transmitted signed received by the transducer 24. A dual trace oscilloscope 30 is used to measure the phase angle difference between the signal presented to the first input transducer 22 and the second output transducer 24.

By way of explanation when an ultrasonic transducer is excited by a sinusoidally varying voltage of frequency $f$ the maximum amplitude of vibration of the transducer will be at the peaks of the curve which indicates the resonant frequency of the transducer. If now two transducers are placed opposite each other, such as the transducers 22 and 24 of FIG. 2, then the maximum amplitude of vibration are shown at A and $A_2$ in FIG. 2 with A and $A_2$ measured as voltages.

The pattern for $A_2$ repersents the formation of standing waves in the chamber 18. If the two signals are examined simultaneously on the oscilloscope 30 two sine waves of equal amplitude are produced. The two sine waves are out of phase by some amount and their phase angle difference is accordingly measured on the scope 30. By varying the frequency and measuring and tabulating the various phase angle differences, a table of values of first order phase angle differences is attained and plotted as shown at X in FIG. 3.

By taking first order difference between successive values the graph Y of FIG. 3 is generated.

A complete operation cycle starts with setting the frequency of the signal generator 26 at a frequency different than that of the resonant frequency of the matched transducers 22 and 24 and measuring the phase angle difference by means of the oscilloscope 30 between the signal coming into the interferometer 10 and the signal received at the output transducer 24. The frequency of the signal generator is then changed, either continuously or in increments so as to approach and pass through the resonant frequency of the transducers. Measurements of the phase angle differences are then continuously made from the oscilloscope and tabulated. After a suitably wide range of frequencies have been examined, the behavior of the phase angle difference as a function of the frequency is studied to determine the velocity of sound in the liquid material in chamber 18 between the transducers. This study may include citing frequency positions where the phase angle difference $\Delta\delta$ exhibits in inflection as a function of frequency $(f)$ where $$\Delta\delta = n\pi/2 \quad (1)$$

radians where $n$ is any positive integer.

With the above described apparatus applicant is able to detect the frequency dependence of the difference in phase angle between the initial and received signal in the interferometer. The manner of measurement of this quantity is as follows. First, the oscillator frequency is set at a prescribed value as indicated by the frequency counter 28. Second, the amplitude of the two signals, as seen in the oscilloscope 30 are made equal by adjustment of the gain and displacement controls of the vertical axis of the oscilloscope also referred to as the cathode-ray tube (CRT). Third, the phase angle difference is measured on the CRT face in terms of a superimposed grid line division. Calibration is normally made at 650 kilohertz for for which a twenty degree phase angle difference equals one scale division. A division at higher frequencies therefore will equal.

$$\text{frequency} \times 20 \text{ degrees}/650 \text{ kHz} \quad (2)$$

Fourth, the oscillator frequency is then increased by ten kilohertz and steps two and three are repeated.

The graph shown in FIG. 3 illustrates the results of a typical measurement of applicant's measurement system. Line X is a plot of phase angle difference (expressed in 100 degree units) versus frequency. Graph Y is a histogram shown in the lower right corner of FIG. 3 and represents, with low resolution, the distribution of the first order derivative of phase angle difference with respect to frequency.

The plot of the first order differences versus frequency is really the distribution of the first derivative of the phase angle difference with respect to frequency. A second derivative of $\Delta\delta$ (or a first derivative of $d\Delta\delta/df$ with respect to the frequency is then performed. The only portion of the second derivative $$d^2\Delta\delta/df^2 \quad (3)$$

examination of importance is where $d\Delta\delta/df$ reaches a maximum value, i.e., where the expression (3) equals zero. These peaks of maximum value are designated at Y, $Y_2$, $Y_3$, etc. The frequencies where these peaks occur are calculated using a weighted averaging technique necessitated by the discrete nature of the measurements and differences between successive peak frequencies determined.

Applicant's procedure resulted in the finding that the differences in frequencies; $Y_1$, $Y_2$, $Y_3$, etc., obey the relationship $$\Delta f = v/2L \quad (4)$$

where $v$ is the velocity of sound in the liquid and L is the distance between the transducers 22 and 24. This relationship is consistent with standing wave theory.

In operation a calibration liquid with a known value of $v$, in this instance distilled water, is introduced into the chamber 18 of the interferometer, $\Delta f$ is measured, and consequently the distance L shown in FIG. 1 is determined from the above relationship. Next a liqudi with unknown $v$ replaces the calibration liquid and $\Delta f$ is measured. Since the distance L is now known, the value $v$ can be obtained for various liquids as shown in the following table:

TABLE 1.—FIRST DERIVATIVE DATA

| Substance | $\Delta f$ (kHz.) | | $v$ (m./sec.) | | $v$ |
|---|---|---|---|---|---|
| Glycerol | 96.62 | 0.88 | 1,906 | 18 | 1,908 |
| Ethylene glycol | 84.40 | 1.00 | 1,665 | 20 | 1,626 |
| Distilled water | 75.88 | 0.16 | 1,497 | 3 | 1,497 |
| Castor oil | 74.61 | 0.48 | 1,472 | 10 | 1,475 |
| 5606A oil | 68.68 | 0.08 | 1,355 | 3 | |
| Benzene | 65.91 | 0.20 | 1,300 | 5 | 1,300 |
| Turpentine | 64.10 | 0.23 | 1,264 | 5 | 1,255 |
| Butyl alcohol | 62.66 | 0.33 | 1,256 | 7 | 1,243 |
| 2-propanol | 57.19 | 0.39 | 1,122 | 8 | |
| Silicone oil | 51.24 | 0.17 | 1,011 | 4 | |

The column $v$ shows the velocities that were obtained from results from W. P. Mason, "Piezoelectric Crystals and Their Application to Ultrasonics," published by D. Van Nostrand Company, Inc., in 1950.

It should be noted that care must be exercised in using applicant's fixed geometry ultrasonic interferometer with fluids which show acoustic dispersion. Observations made by J. Rupano, published in Phys. Rev. 72 (1947), failed to detect evidence of a dependence of velocity on frequency in many organic liquids.

A modification of applicant's invention would be to replace the oscilloscope 30 as a measurer of $\Delta\delta$ with a phase meter possessing an analog output to drive an XY plotter. The phase meter could be of various commercial types such as that manufactured by AD–YU Electronics, Inc. Type 406 H–L Precision Phase Meters. It if is desired in observing the peaks or $$d^2\Delta\delta/df^2 = 0 \quad (5)$$

positions in the frequency domain, a differentiation circuit may be connected to the output of the phase meter referred to above and this differentiation circuit used in turn, to trigger the counter-printer system to automatically obtain the information. One example of such a derivative circuit would be a Model Type 0 Operational Amplifier Plug in unit manufactured by Tektronix Scope, Inc.

Frequency differences between $\Delta\delta = n\pi$ phase conditions in a fixed geometry ultrasonic interferometer can be reduced by increasing the transducer separation distance. Such a reduction provides improved resolution for the detection of non-linear regions in the interferometer's frequency response. However, it should be noted that large intratransducer separations limit the usefulness of the interferometer as applied to highly absorbing liquids. This unfavorable feature is further augmented by the empirical fact that large attenuation factors are usually accompanied by high values of propagation velocities; a condition which increases the aforementioned frequency differences. It is therefore imperative that the configuration of applicant's fixed geometry interferometer be selected with a particular class of liquids in mind such as the class represented in Table 1.

I wish it to be understood that I do not desire to be limited to the exact details of construction shown and described, for obvious modifications will occur to a person skilled in the art.

What I claim is:

1. A device for measuring the velocity of ultrasonic waves in a liquid comprising, in combination an ultrasonic interferometer defining a chamber to contain said liquid, opposed input and output transducers having matched frequencies disposed on opposite sides of said chamber, means for connecting said input transducer to a variable frequency signal generator for imparting voltage thereto, whereby said input transducer transmits an acoustic wave signal through the liquid for reception by said output transducer, means for measuring the phase angle difference between the signals at said input and output transducers and means to record the behavior of the phase angle difference as a function of the frequency of said signal generator whereby the velocity of sound in the liquid is determined.

2. The device in accordance with claim 1 in which said signal generator is an oscillator providing a sinusoidally varying voltage to said input transducer.

3. The device in accordance with claim 2 in which said measuring means includes an oscilloscope having a first channel connected to said oscillator and a second channel connected to said output transducer.

4. The device in accordance with claim 3 in which said measuring means includes a frequency counter for monitoring said signal generator.

5. The device in accordance with claim 1 in which said measuring means includes a phase meter having an analog output connected to said recording means which includes an XY plotter.

6. The device in accordance with claim 1 in which said measuring means includes a phase meter whose output is connected to derivative circuit means, the output of said derivative circuit means in turn triggering counter-printer means.

7. The method of measuring the velocity of ultrasonic waves in a liquid environment including the steps of applying a frequency from a signal generator to a pair of spaced, matched input and output transducers positioned on either side of said environment; varying the frequency of the signal generator over the frequency response range of said transducers; continuously measuring the phase angle difference between the signals at the input and output transducers by means of a phase meter; determining the frequencies where the first derivative of phase angle difference with respect to frequency is a maximum by means of a derivative circuit; and computing the sound velocity in the liquid from the behavior of the phase angle difference as a function of said frequency.

References Cited
UNITED STATES PATENTS

| | | | |
|---|---|---|---|
| 2,758,663 | 8/1956 | Snavely | 73—67.6X |
| 3,316,755 | 5/1967 | Ensley | 73—67.5 |

OTHER REFERENCES

McDade et al.: "Sound Velocity in Water Above 212° F.," Jour. Acos. Soc. of Amer., October 1959, pp. 1380–3.

RICHARD C. QUEISSER, Primary Examiner

A. E. KORKOSZ, Assistant Examiner

U.S. Cl. X.R.

73—67.6, 67.7